United States Patent Office 2,784,986
Patented Mar. 12, 1957

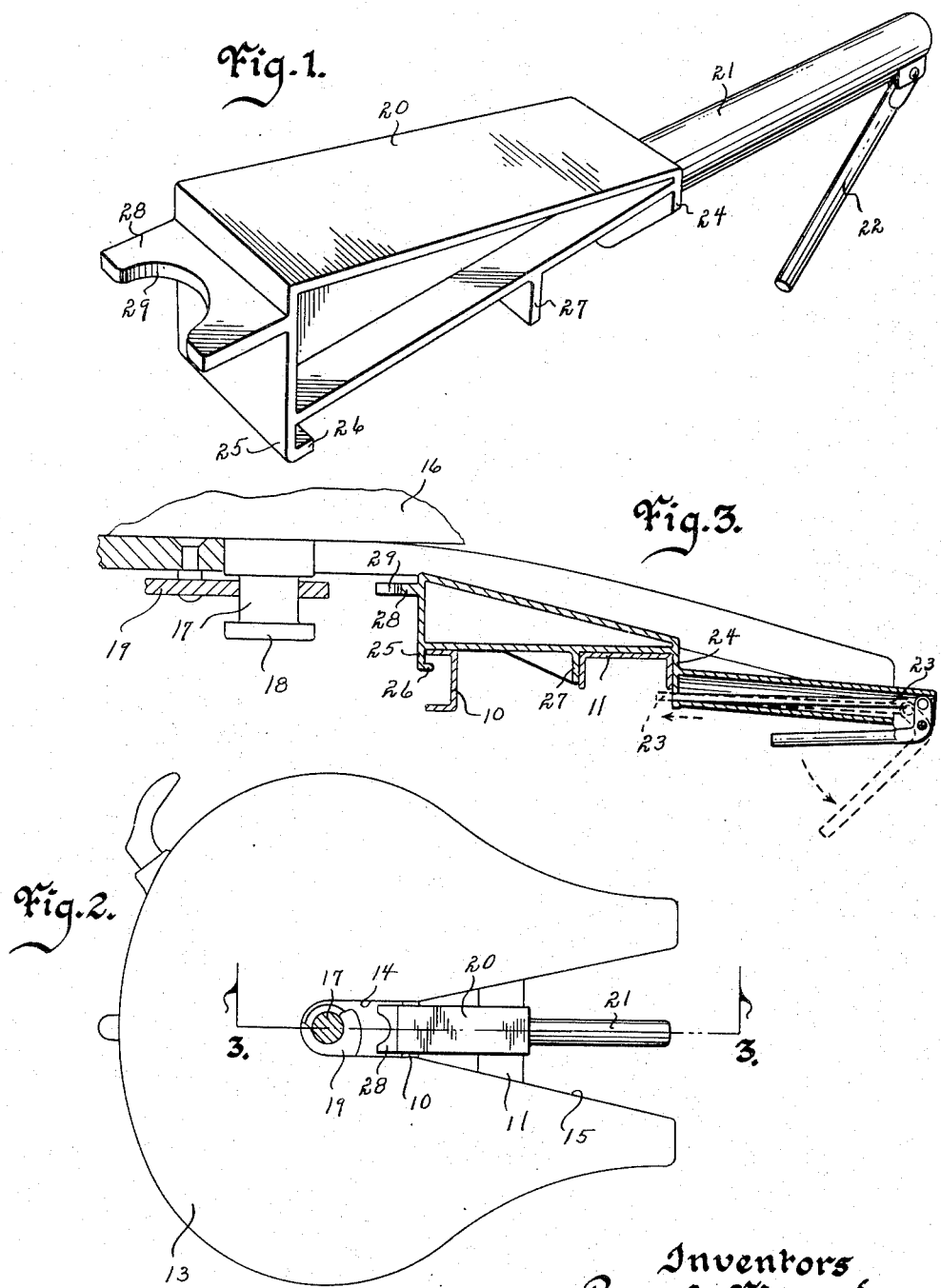

2,784,986

DEVICE FOR PREVENTING THE ACCIDENTAL UNCOUPLING OF FIFTH WHEELS

Roy L. Finch, Melcher, and Dwight C. Hess, Des Moines, Iowa

Application April 1, 1954, Serial No. 420,388

2 Claims. (Cl. 280—432)

This invention relates to automotive vehicles such as tractors and trailers and more particularly to a means for preventing the accidental detachment of the tractor from the trailer.

The usual method of coupling a tractor to a trailer is by use of a horizontal plate on the tractor and a vertical stub shaft or pin on the trailer and which bears through a hole in the center of the plate. Such means is commonly known as a "fifth wheel." While such detachable coupling means is universally used, it is often unsuccessful in operation, in that the pin locking means fails and the tractor moves forwardly causing the pin to slide through the slot opening and drop the trailer.

Therefore, the principal object of our invention is to provide a means for blocking the slot opening of the fifth wheel so that the trailer pin cannot slide therethrough.

A further object of this invention is to provide a fifth wheel slot blocking device that may be easily and quickly installed or removed.

Still further objects of our invention are to provide a fifth wheel slot closing device that is positive in operation, economical in manufacture, and durable in use.

These and other objects will be apparent to those skilled in the art.

Our invention consists in the construction, arrangement, and combination of the various parts of the device, whereby the objects contemplated are attained as hereinafter more fully set forth, specifically pointed out in our claims, and illustrated in the accompanying drawings, in which:

Fig. 1 is a perspective view of our device ready for installation,

Fig. 2 is a top plan view of our device installed and in use,

Fig. 3 is a longitudinal sectional view of our device in use and taken on line 3—3 of Fig. 2.

In these drawings, we have used the numerals 10 and 11 to designate the two rear cross frame portions of the chassis of a tractor. Substantially all tractors are similar in chassis construction with the frame 10 being a U-beam open to the front and the frame 11 being a U-beam open to the bottom as shown in Fig. 3. The numeral 13 designates the fifth wheel plate of the tractor having the central opening 14 which has parallel longitudinal sides and which sides extend rearwardly and outwardly away from each other to form the wedge entrance slot 15 in the rear portion of the plate. The numeral 16 designates the trailer having the pin or stub shaft 17. On the free end of the shaft 17 is a head portion 18 having a diameter greater than the width of the opening portion 14, but less than the major length of the slot opening 15. The numeral 19 designates a hook catch means on the underside of the plate of the fifth wheel and which detachably engages and is intended to hook around the rear side of the trailer pin 17, and prevent its rear sliding movement from the plate through the slot entrance 15.

It is the failure of this mechanism 19 that causes trouble, resulting in danger to life, and property, as well as loss of valuable time. It is to such fifth wheel mechanism that we apply our invention and which we will now describe in detail. The numeral 20 designates a frame base portion having a flat horizontal bottom and extending in height as it progresses forwardly as shown in Fig. 1. Formed on the rear end of the member 20 is a tubular handle 21. The numeral 22 designates a lever pivotally connected at its upper end to the rear end of a rod 23. This lever is hinged near its end to the rear bottom of the tube 21 and then has its free end portion bent forwardly at near a right angle. The rod extends forwardly inside the tube 21, and when the lever 22 is lowered as shown by dotted lines in Fig. 3, will protrude forwardly to a point beyond the rear end of the frame 20. As the tube is in a plane below the rear end of the frame 20 due to the frame having a depending transverse flange 24, the forward end of the rod 23 will be substantially below the bottom of the frame portion 20. The numeral 25 designates a transverse depending flange on the forward end of the frame 20. This flange 25 has a rearwardly extending hook flange 26. The numeral 27 designates a transverse depending flange on the center bottom of the frame 20. The numeral 28 designates a forwardly extending horizontal flange on the forward end of the frame 20. This flange 28 has a one-half round cut-out 29 in its forward center end as shown in Fig. 2.

To install our device it is merely necessary to grasp the handle 21 with the lever 22 up near the bottom of the handle and insert the unit so that the flange 25 is forward of the top leg of the frame 10 and with the hook portion 26, hooked under the top leg of the frame 10, as shown in Fig. 3. When this is done and the device lowered the flange 27 will engage the front of the beam 11, and the flange 24 will be at the rear of the beam 11. The upper portion of the frame 20 will be between the slot walls of the slot opening of the plate 13 and thus prevent lateral movement of the device. The flange 28 will be beyond the rear opening of the opening 14 and to the rear of the trailer pin 17. By releasing the lever 22, it will fall down by gravity, moving the rod 23 forwardly and under the frame 11. In case the latch means 19 fails to function the undesirable movement of the trailer pin rearwardly through the expanding slot opening 15 will be blocked by its engagement with the notch 29 of the flange 28. When, however, it is desired to detach the trailer from the tractor our device is removed and this is easily accomplished merely by raising the lever 22 to withdraw the locking rod 23, at which time the device is raised, unhooked from the beam 10, and lifted from the tractor.

Some changes may be made in the construction and arrangement of our device for preventing the accidental uncoupling of fifth wheels without departing from the real spirit and purpose of our invention, and it is our intention to cover by our claims, any modified forms of structure or use of mechanical equivalents which may be reasonably included within their scope.

We claim:

1. In combination, a tractor frame having a cross frame and a slotted fifth wheel plate, a trailer part having a vertical pin detachably extending into said slotted fifth wheel, a slot blocking means comprising, a base member, a hooked flange on said base detachably engaging said cross frame, a projection on the forward end of said base in the vertical plane of the slot in said fifth wheel plate and to the rear of the pin of said trailer, and a catch means for preventing the upward movement of said base relative to said cross frame.

2. In combination, a tractor frame having a cross frame and a slotted fifth wheel, a trailer part having a vertical pin detachably extending into said slotted fifth wheel, a slot blocking means comprising, a base member, a flange on said base detachably engaging said cross frame, a projection on the forward end of said base in the vertical plane of the slot in said fifth wheel plate and to the rear of the pin of said trailer, and a lever actuated catch means for preventing the upward movement of said base relative to said cross frame.

References Cited in the file of this patent

UNITED STATES PATENTS

| | | |
|---|---|---|
| 2,258,432 | Winn | Oct. 7, 1941 |
| 2,294,710 | Berg et al. | Sept. 1, 1942 |
| 2,317,508 | Zoder | Apr. 27, 1943 |
| 2,438,346 | Mooney | Mar. 23, 1948 |